US005087517A

United States Patent [19]

Sagawa et al.

[11] Patent Number: 5,087,517

[45] Date of Patent: Feb. 11, 1992

[54] COMPOSITE SHEET USED FOR REPRODUCIBLE ELECTROSTATIC IMAGE DISPLAY OR RECORD

[75] Inventors: Kouichiro Sagawa, Kawasaki; Nobuyoshi Kitamura, Sagamihara; Masako Ueda, Mitaka; Koji Takeuchi, Yokohama, all of Japan

[73] Assignees: Ajinomoto Co., Inc.; Sony Corporation, both of Tokyo, Japan

[21] Appl. No.: 433,136

[22] Filed: Nov. 8, 1989

[30] Foreign Application Priority Data

| | | | |
|---|---|---|---|
| Nov. 9, 1988 | [JP] | Japan | 63-282977 |
| Dec. 23, 1988 | [JP] | Japan | 63-326463 |
| Dec. 23, 1988 | [JP] | Japan | 63-326464 |
| Dec. 23, 1988 | [JP] | Japan | 63-326465 |

[51] Int. Cl.[5] .......... B32B 5/16

[52] U.S. Cl. .......... 428/329; 428/323; 428/336; 428/403; 428/412; 428/413; 428/446; 428/516; 428/519

[58] Field of Search .......... 428/324, 323, 408, 329, 428/336, 403, 412, 413, 446, 516, 519

[56] References Cited

U.S. PATENT DOCUMENTS

| | | | |
|---|---|---|---|
| 3,158,528 | 11/1964 | Brown | 428/324 |
| 3,493,369 | 2/1970 | Busch | 252/500 |
| 3,523,061 | 8/1970 | Purvis | 428/324 |
| 4,163,075 | 7/1979 | Nakano et al. | 428/328 |
| 4,241,134 | 7/1981 | Fujioka et al. | 428/328 |
| 4,279,961 | 12/1980 | Burwasser | 428/331 |
| 4,286,017 | 8/1981 | Nakamura et al. | 428/304 |
| 4,291,084 | 9/1981 | Segal . | |
| 4,308,314 | 12/1981 | Nakano et al. | 428/409 |
| 4,322,469 | 3/1982 | Nakano et al. | 428/212 |
| 4,389,451 | 6/1983 | Fujioka et al. | 428/323 |
| 4,568,604 | 2/1986 | Kurtz et al. | 428/324 |
| 4,692,392 | 9/1987 | Ichimura et al. | 430/62 |
| 4,713,283 | 12/1987 | Cogswell et al. | 428/408 |
| 4,713,698 | 12/1987 | Takahashi et al. | 358/296 |
| 4,806,421 | 2/1989 | Morishita et al. | 428/324 |
| 4,973,514 | 11/1990 | Gamble et al. | 428/408 |

FOREIGN PATENT DOCUMENTS

| | | |
|---|---|---|
| 0145463 | 6/1985 | European Pat. Off. . |
| 59-006235 | 1/1984 | Japan . |
| 58223152 | 4/1984 | Japan . |
| 59-97151 | 9/1984 | Japan . |
| 61-055217 | 3/1986 | Japan . |
| 61204641 | 2/1987 | Japan . |
| 61233748 | 3/1987 | Japan . |
| 1012795 | 12/1965 | United Kingdom . |
| 1363563 | 8/1974 | United Kingdom . |
| 1412422 | 11/1975 | United Kingdom . |
| 2025264 | 1/1980 | United Kingdom . |
| 2031757 | 4/1980 | United Kingdom . |
| 2064373 | 6/1981 | United Kingdom . |
| 2103514 | 2/1983 | United Kingdom . |
| 2166370 | 5/1986 | United Kingdom . |
| 2179272 | 3/1987 | United Kingdom . |
| 2190019 | 11/1987 | United Kingdom . |

*Primary Examiner*—Merrell C. Cashion, Jr.
*Assistant Examiner*—Robert J. Follett
*Attorney, Agent, or Firm*—Oblon, Spivak, McClelland, Maier & Neustadt

[57] ABSTRACT

Disclosed herein is a composite sheet for reproducible electrostatic image display or record comprising, a semiconductor film containing an electroconductive filler and having a uniform surface resistivity of a range of $10^3$ to $10^{10}$ 106 /□ and a highly dielectric film having a specific dielectric constant of not less than 5, laminated with the semiconductor film.

20 Claims, 4 Drawing Sheets

COMPOSITE SHEET USED FOR REPRODUCIBLE ELECTROSTATIC IMAGE DISPLAY OR RECORD

BACKGROUND OF THE INVENTION

The present invention relates to a composite sheet used for reproducible electrostatic image display or record by a direct electrification method. Such a composite sheet is used in apparatus for displaying, transmitting and recording a large sized image information such as large displays, large facsimile machines and large screen copying machines that utilize electrostatic latent images.

Method of displaying, transmitting and recording electrostatic images by utilizing electrostatic latent image is generally classified into two groups, i.e., indirect electrification (charging) system and direct electrification (charging) system. As the material for electrostatic recording used in the indirect charging system, photoconductive material prepared by laminating a photo-semiconductor film such as a selenium-evaporated film, poly-N-vinylcarbazole or a charge transfer complex of poly-N-vinylcarbazole and trinitrofluorenone on an electroconductive layer has been put to practical use as the material for constituting a photoconductive drum in a copying machine. In addition, electrostatic recording paper prepared by coating a material obtained by dispersing photo-conductive material such as zinc oxide, lead oxide or titanium oxide in a highresistance adhesive resin, on an electrified substrate paper has also been used generally as recording paper for copying machine or facsimile machine. However, among the composite materials for the electrostatic recording used in the indirect charging system, those using a photo-semiconductor film such as a selenium-evaporated film can be used reproducibly but, since it is difficult to obtain a film of large area and its production cost is expensive, it is attended with a remarkable economical difficulty in producing an electrostatic recording machine such as a large-sized copying machine or facsimile machine by using this material. On the other hand, electrostatic recording paper prepared by coating a resin containing photoconductive material such as zinc oxide on an electroconductive paper can easily be produced into a recording paper of large area and the production cost thereof is inexpensive. However, since such a material is used paper as a substrate, it has a drawback that electroconductivity changes along with the humidity change, and the strength and durability are poor. Furthermore, since it can not be used repeatingly by erasing once recorded image, the material can not be utilized for reproducible electrostatic image display or record.

Electrostatic recording material based on the direct charging system usually comprises a dielectric layer possessing static electric charges and a semiconductor layer having a function as an electrode, in which image recording is usually conducted by a method of applying directly a voltage to the material, thereby forming electrostatic images on the surface and then visualizing them with toner or the like.

For the electrostatic recording material used in such direct charging system, electrostatic recording paper prepared by laminating a dielectric layer composed of a dielectric resin such as acrylic acid ester resin, acrylic styrene resin, methacrylic resin, vinyl chloride/vinyl acetate copolymer, silicon resin, alkyd resin or epoxy resin and inorganic powders such as barium sulfate, titanium oxide, calcium carbonate or kaolinite on the surface of an electrified substrate paper has been used as the recording paper for copying machines, etc. However, this electrostatic recording paper also has problems in view of durability, humidity proofness, stability of electroconductivity, etc. as the electrostatic recording paper in the indirect charging system previously described above prepared by coating the photo-conductive material, and therefore, it can not be used as the material for reproducible electrostatic image display or record.

As has been described above, since electrostatic recording can easily provide those functions such as copy and transmission collectively as compared with other electronic recording methods, it has an advantageous effect to be applicable to various application uses such as copying machine, facsimile machine, etc. However, since most of conventional electrostatic recording materials can not be used for inexpensive and reproducible large size image display or record, their use is limited only to non-reproducible electrostatic recording paper and the application to large sized display, large sized copying machine or large sized facsimile machine has been extremely difficult.

For instance, in Japanese Patent Application Laid-Open (KOKAI) 64-966 (1989) [corresponds to GB 2206842], a display material comprising a dielectric film of polyvinylidene fluoride, an electroconductive film containing zinc oxide, titanium oxide and titanium as an electroconductive substance and a reinforcing sheet of vinyl chloride is proposed as an electroconductive composite sheet used for an electron black board.

Since the display material disclosed in Japanese Patent Application Laid-Open (KOKAI) No. 64-966 (1989) has a problem that the whiteness is not sufficient and the whiteness is reduced with the change in the passage of time when exposed to light, and the non-mobile image or still image forming performance is reduced with the change in the passage of time in accordance with the increase of the resistance of the electroconductive composite sheet by the repeating use, if a large sized display is manufactured by using such material as the display surface for electrostatic images, it brings about a problem that the sharpness or appearance of the image is deteriorated and it is not quite satisfactory.

In view of the above, an object of the present invention is to provide, with an economical advantage, a material for reproducible large area electrostatic image display that can be used also for apparatus of displaying, transmitting and recording a large area image information, such as large sized displays, large sized facsimile machines and large sized copying machines, while taking the advantage of the electrostatic recording, that is, high speed recording, recording storability and wide application use.

Another object of the present invention is to provide a composite sheet having improved whiteness and light fastness for reproducible electrostatic image display or record capable of obtaining images with sharp contrast when it is used as the display surface of a large size display.

As a result of the present inventors' earnest study for attaining the above-mentioned objects, it has been found that a composite sheet obtained by laminating a highly dielectric film having a specific dielectric constant of not less than 5 on a semiconductor film containing an electroconductive filler, for example, a fibrous or flaky electroconductive filler and having a surface resistivity of from $10^3$-$10^{10}$ Ω/□ is useful as a reproducible electrostatic image display or record material, has a stable non-mobile image or still image forming performance in a circumstance at low to high humidity condition, in which the non-mobile image or still image forming performance is not reduced by the repeating use, and is excellent in the durability. The present invention has been accomplished based on this findings.

SUMMARY OF THE INVENTION

In a first aspect of the present invention, there is provided a composite sheet for reproducible static image display or record comprising, a semiconductor film containing a fibrous or flaky electroconductive filler and having a uniform surface resistivity of from $10^3$ to $10^{10}$ Ω/□; and a highly dielectric film having a specific dielectric constant of not less than 5, laminated with the semiconductor film.

In a second aspect of the present invention, there is provided a composite sheet for reproducible electrostatic image display or record comprising a semiconductor film containing a fibrous electroconductive filler having an aspect ratio of 10 to 10,000 and the length of the major axis of from 0.1 μm to 5 mm, and having a uniform surface resistivity of from $10^3$ to $10^{10}$ Ω/□; and a highly dielectric film having a specific dielectric constant of not less than 5, laminated with the semiconductor film.

In a third aspect of the present invention, there is provided a composite sheet for reproducible electrostatic image display or record comprising a semiconductor film containing a flaky electroconductive filler having a flake diameter of from 10 μm to 5 mm, an aspect ratio (major axis/minor axis) of from 10 to 1,000 and a thickness of from 0.05 to 10 μm, and having a uniform surface resistivity of from $10^3$ to $10^{10}$ Ω/□; and a highly dielectric film having a specific dielectric constant of not less than 5, laminated with the semiconductor film.

In a fourth aspect of the present invention, there is provided a composite sheet for reproducible electrostatic image display or record comprising a semiconductor film containing an electroconductive filler covered with a composite oxide comprising from 80 to 90% by weight of tin oxide (calculated as Sn) and from 10 to 20% by weight of antimony oxide (calculated as Sb), and having a uniform surface resistivity of from $10^3$ to $10^{10}$ Ω/□; and a highly dielectric film having a specific dielectric constant of not less than 5, laminated with the semiconductor film.

In a fifth aspect of the present invention, there is provided a composite sheet for reproducible electrostatic image display or record comprising a semiconductor film containing an electroconductive filler covered with a composite oxide comprising from 85 to 90% by weight of tin oxide (calculated as Sn), from 10 to 15% by weight of antimony oxide (calculated as Sb) and from 0.05 to 1% by weight of cobalt oxide (calculated as Co), and having a uniform surface resistivity of from $10^3$ to $10^{10}$ Ω/□; and a highly dielectric film having a specific dielectric constant of not less than 5, laminated with the semiconductor film.

In a sixth aspect of the present invention, there is provided a composite sheet for reproducible electrostatic image display or record comprising a semiconductor film containing an electroconductive filler and having a uniform surface resistivity ranging from $10^3$ to $10^{10}$ Ω/□; and a highly dielectric film having a specific dielectric constant of not less than 5, laminated with the semiconductor film, and having a whiteness (L value) of not less than 85 and a color difference (ΔE) of not greater than 4.

BRIEF DESCRIPTION OF THE DRAWINGS

FIG. 12(*b*) is a cross sectional view of a head weight of the apparatus;

FIG. 12(*c*) is a side elevational view of the apparatus; and

FIG. 12(*d*) is a top plan view of the apparatus.

DETAILED DESCRIPTION OF THE INVENTION

Figure 1:
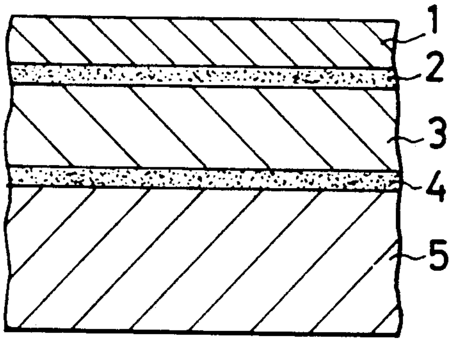
FIGS. 1, 2, 5, 6, 8, 9 and 10 show, respectively, composite sheets in which a semiconductor film and highly dielectric film are laminated by using a tack agent.

The composite sheet according to the present invention comprises a two layer structure in which a dielectric film for possessing electrostatic charges and a semiconductor film as an electrode are laminated, or comprises a three layer structure in which a dielectric film for possessing electrostatic charges and a semiconductor film as an electrode are laminated by using a tack agent layer. Further, a multi-layered structure in which a reinforcing resin film is laminated may also be employed. In any of the cases, the function as the composite sheet for electrostatic image display or record is mainly derived from the two layers, i.e., the dielectric film and the semiconductor film.

The semiconductor film used in the present invention has to possess a stable resistance and should withstand for repeating use, even when mechanical tension is applied or circumstance conditions such as temperature or humidity are changed. Therefore, paper can not be used as a substrate in the conventional electrostatic recording paper. As a film base, non-cellulose synthetic polymer such as polyethylene, polypropylene, polystyrene, vinyl acetate resin, vinyl chloride resin, silicon resin, rubber, epoxy resin, polyurethane, acrylic resin and polycarbonate is used alone, or as a blend. Among all, a so-called paint resin such as polyurethane, epoxy resin and vinyl acetate resin is preferred in view of easy fabricability to film.

As a method of providing these resins with electroconductivity, there has generally been proposed a method of kneading or surface-coating an anionic resin such as polysulfonate etc. or cationic resin such as quaternary ammonium salt of acrylic resin etc., a method of kneading or surface-coating a surfactant, a method of kneading an electroconductive filler, a method of evaporating electroconductive inorganic material such as indium oxide etc. to the surface and the like. However, since the electroconductive resin film obtained by the method of using the ionic polymer or the surfactant has a drawback that the resistance thereof remarkably changes due to the temperature and humidity changes, and the electroconductive resin film obtained by the method of evaporating the electroconductive inorganic material to the surface has a drawback that the resistance is abruptly increased due to the mechanical tension applied on the film. Accordingly, a method of kneading the electroconductive filler is employed for the semiconductor film used in the composite sheet according to the present invention.

As the example of the electroconductive filler used in the present invention, the followings may be exemplified.

(1) Fibrous electroconductive filler having an aspect ratio of from 10 to 10,000, preferably, from 20 to 2,000, and the length of the major axis of from 0.1 μm to 5 mm, preferably, from 5 μm to 1 mm.

(2) Flaky electroconductive filler having a flake diameter of from 10 μm to 5 mm, preferably, from 10 μm to 200 μm, an aspect ratio (major axis/minor axis ratio) of from 10 to 1,000, preferably, from 20 to 500, and a thickness of from 0.05 μm to 10 μm, preferably, from 0.1 μm to 5 μm.

(3) Fibrous e filler covered with a composite oxide comprising from 80 to 90 wt %, preferably, from 83 to 87 wt % of tin oxide (calculated as Sn) and from 10 to 20 wt %, preferably, from 13 to 17 wt % of antimony oxide (calculated as Sb) and having an aspect ratio of from 10 to 10,000, preferably, from 20 to 2,000, and the length of major axis of from 0.1 μm to 5 mm, preferably, from 5 μm to 1 mm.

(4) Flaky electroconductive filler covered with a composite oxide comprising from 80 to 90 wt %, preferably, from 83 to 87 wt % of tin oxide (calculated as Sn) and from 10 to 20 wt %, preferably, from 13 to 17 wt % of antimony oxide (calculated as Sb) and having a flake diameter of from 10 μm to 5 mm, preferably, from 10 μm to 200 μm, an aspect ratio (major axis/minor axis ratio) of from 10 to 1,000, preferably, from 20 to 500, and thickness of from 0.05 μm to 10 μm, preferably, from 0.1 μm to 5 μm.

(5) Fibrous electroconductive filler covered with a composite oxide comprising from 85 to 90 wt %, preferably, from 85 to 87 wt % of tin oxide (calculated as Sn), from 10 to 15 wt %, preferably, from 13 to 15 wt % of antimony oxide (calculated as Sb) and from 0.05 to 1 wt %, preferably, from 0.05 to 0.07 wt % of Cobalt oxide (calculated as Co) and having an aspect ratio of from 10 to 10,000, preferably, from 20 to 2,000 and the length of major axis of from 0.1 μm to 5 mm, preferably, from 5 μm to 1 mm.

(6) Flaky electroconductive filler covered with a composite oxide comprising from 85 to 90 wt %, preferably, 85 to 87 wt % of tin oxide (calculated as Sn), from 10 to 15 wt %, preferably, 13 to 15 wt % of antimony oxide (calculated as Sb) and from 0.05 to 1 wt %, preferably 0.05 to 0.07 wt % of Cobalt oxide (calculated as Co) and having a flake diameter of from 10 μm to 5 mm, preferably, from 10 μm to 200 μm, an aspect ratio (major axis/minor axis ratio) of from 10 to 1,000, preferably, from 20 to 500, and a thickness of from 0.05 μm to 10 μm, preferably, from 0.1 μm to 5 μm.

The aspect ratio of the fibrous or flaky electroconductive filler is one of preferable factors for maintaining the film fabricability of the semiconductor film and possessing the stability of the resistance to mechanical tension. For instance, if granular electroconductive zinc oxide is used as the electroconductive filler, since it has to be added in a greater amount for providing electroconductivity as compared with the fibrous conductive filler, the resin becomes hard to result in a difficulty for the film fabrication and, at the same time, reduce the mechanical strength of the film. In addition, there is a problem that contacts between each of the electroconductive fillers are disconnected due to the mechanical tension applied during repeating use, thereby increasing the resistance thereof. Accordingly, the fibrous electroconductive filler having an aspect ratio of from 10 to 10,000 and a flaky electroconductive filler having a flake diameter of from 10 μm to 5 mm and an aspect ratio of from 10 to 1,000 and a thickness of 0.05 μm to 10 μm are preferred.

Examples of the fibrous electroconductive filler are electroconductive carbon fibers, stainless steel fibers, aluminum fibers and metallized glass fibers, as well as fibrous titanium dioxide, alkali metal titanate fiber covered with tin oxide and antimony oxide (refer to Japanese Patent Application Laid-Open (KOKAI) No. 57-10320) and electroconductive fibers produced by the methods as described in Japanese Patent Application Laid-Open (KOKAI) Nos. 59-6235, 59-102820, 59-141425, 60-112618, 61-55217, 61-55218 and 61-55219.

Referring to the length of the major axis of the electroconductive fibers, if it is longer than 5 mm, it is difficult to uniformly disperse them into the resin. On the other hand, if it is shorter than 0.1 μm, stability of the resistance when put under tension becomes to be reduced.

Examples of the flaky electroconductive filler are aluminum flake, nickel flame, nickel coated mica, etc.

As one of core materials for the electroconductive filler covered with the composite oxide, the flaky or plate-like core materials are also referred, and mica is typical material. Referring to natural mica as an example, mica is aluminum silicate cleavaging mineral, there are various kinds depending on the ingredients contained, and muscovite (white mica) is preferred. Sericite, talc, etc. can also be mentioned.

As artificial material of the core material, there can be mentioned mica surface-coated with titanium oxide, glass flake, alumina flake, etc.

The fibrous material of another core material includes natural and artificial material. As a typical natural material, asbesto and wollastonite can be mentioned. Asbesto has been used long time as fibrous core material and has an excellent nature such as reinforcing performance, but the use of asbesto has now been legally inhibited since the material is considered to cause asbesto pulmonum or cancer. Wollastonite is often used as anhydrous calcium silicate. As artificial material, there can be mentioned titanium dioxide fiber, zinc oxide fiber, potassium titanate fiber, plaster fiber, xonotlite, MOS fiber ($MgSO_4.5MgO.8H_2O$), PMF (Processed Mineral Fiber), glass fiber, alumina fiber, ceramic fiber and rockwool fiber.

In addition to the core materials described above, any of core materials can be used in the present invention so long as they are white fibrous or flaky fibers. However, core materials decomposing, melting or denaturing within a temperature range from 200° to 800° C. are not preferred.

When fibrous or flaky electroconductive filler covered with composite oxides is used as the electroconductive filler, it is possible to provide a white composite sheet for electrostatic image display or record having excellent whiteness and light fastness.

An example for preparing an electroconductive fiber covered with composite oxide used in the present invention is to be described.

(a) Tin chloride and an antimony compound such as antimony trichloride or (b) tin chloride, antimony compound such as antimony trichloride and cobalt chloride are added to an aqueous alkaline solution (pH of 10 to 14), to which core material is added, to form a membranes of composite tin-antimony hydroxide on the surface of the core material. Then, they are aged in an acidic solution (pH of less than 6), dewatered and dried and then heated to a high temperature of 200° C. to 800° C., thereby coating a membrane of composite oxides thereon.

If the ratio of tin oxide in the composite oxides is greater than 90% by weight (calculated as Sn), although the whiteness is improved, the electroconductivity tends to be less developed. On the other hand, if the content of antimony oxide is high, the tone of filler changes from grey to black and the whiteness tends to be reduced.

By adding from 0.05 to 1% by weight of cobalt oxide (calculated as Co), it can be prevented that the whiteness is reduced when exposed to light.

The amount of the composite oxides to be coated on the core material is from 10 to 30% by weight and, preferably, from 15 to 25% by weight (calculated as metal).

There is no particular restriction for the method of preparing a semiconductor film by dispersing the electroconductive filler into the above-mentioned resin, but usual resin processing method may be employed. For example, in the case of using a thermoplastic resin, a film can be obtained easily by dispersing a electroconductive filler into the resin by using a kneading machine such as a heat roll or ribbon mixer and then forming a film thereof by using an extruder, T-die, calender, etc. It is also possible to employ a method of dissolving the resin into a solvent such as methyl ethyl ketone, toluene, alcohol or dimethylformamide, adding a electroconductive filler, kneading them by using a three roll machine to prepare a paint, casting a film by using an applicator, gravure proofer, etc. and then preparing a semiconductor film by drying to eliminate the solvent. In this case, usual additives for the resin such as white pigment, for example, titanium dioxide or zinc powder, inorganic color pigment, for example, red oxide, as well as dye, antioxidant, UV-absorber, plasticizer, lubricant, surface treating agent or coupling agent may be added with no troubles within such a range as not deteriorating the electroconductivity, to attain the respective functions of these additives.

There is no particular restriction for the thickness of the semiconductor film and it can be set optionally within such a range that the performance of the electrode can usually be obtained. For example, it is preferred from 10 to 1,000 μm, more preferably 30 to 100 μm.

When preparing the semiconductor film, the amount of the electroconductive filler to be added to the base resin in the film can be properly controlled such that the surface resistivity of the semiconductor film ranges from $10^3$ to $10^{10}$ Ω/□, preferably from $10^5$ to $10^8$ Ω/□. For example, the electroconductive filler is added to the base resin in the range of from 50 to 200% by weight, preferably, from 70 to 150% by weight based on the base resin.

If the addition amount of the electroconductive filler is too much and the resistance is lowered to less than the above-mentioned range, ghost is liable to occur making it difficult to obtain a sharp image upon forming an electrostatic latent image by applying a voltage to the composite sheet. On the other hand, if the addition amount is insufficient and the resistance of the film is increased to greater than the above-mentioned range, it is no more possible to obtain an electrostatic latent image unless a high voltage is applied, thereby increasing electrical burden on the side of the apparatus.

The addition amount of the composite oxide-coated electroconductive filler and the white pigment added to the base resin can be properly adjusted such that the surface resistivity of the semiconductor film is maintained to a range from $10^3$ to $10^{10}$ Ω/□, preferably, from $10^5$ to $10^8$ Ω/□, the whiteness is not less than 85, preferably not less than 86 and, more preferably, from 87 to 93 and the change of tone due to the exposure of light (15 W fluorescent lamp at a distance of 3 cm for exposure time of 5 hr.), that is, color difference relative to the initial tone ($\Delta E$) is not greater than 4, preferably, not greater than 3 and, more preferably, not greater than 2.

For example, the composite oxide-coated electroconductive filler is added to the base resin in the range of from 50 to 200% by weight, preferably, from 70 to 150% by weight based on the base resin and the white pigment is added to the base resin in the range of from 50 to 200% by weight, preferably, from 70 to 150% by weight based on the base resin.

If the addition amount of the composite oxide-coated electroconductive filler is too much and the resistance is reduced to less than the range described above, whiteness or light fastness is reduced and ghost is liable to occur upon preparing electrostatic latent image by applying a voltage to the composite sheet, making it difficult to obtain a clear image. On the other hand, if the addition amount is insufficient and the resistance of the film is increased to greater than the above-mentioned range, although the whiteness and the light fastness are satisfactory, it is no more possible to obtain an electrostatic latent image unless a high voltage is applied, thereby increasing electrical burden on the side of the apparatus.

When the resistance of the semiconductor film is controlled within the above-mentioned range, it is possible to use other known electroconductive filler together, for example, potassium titanate fiber coated with tin oxide, antimony oxide, etc. or granular electroconductive zinc oxide within such a range as not deteriorating the stability of the resistance, the reinforcing effect, etc. which are the advantageous effects of the electroconductive filler.

In the dielectric film used for the composite sheet according to the present invention, if the dielectric constant is low, the electrostatic capacitance of the composite sheet is reduced and sufficient electrostatic charge to attract the toner can no more be maintained and no clear image can be obtained. In this case, although the electrostatic capacity of the composite sheet with a resin of low dielectric constant can be increased by reducing the film thickness, there occurs an additional problem that insulation destruction is liable to occur. Accordingly, a highly dielectric film having a specific dielectric constant of not less than 5, preferably, not less than 7 is used in the present invention. In addition, such a dielectric film has to be withstand for reproducible use and various properties are required therefor such as easy erasing of once deposited toner, low frictional resistance, high voltage withstanding, etc. As highly dielectric resin capable of satisfying these requirements, there can be mentioned, for example, polyvinylidene fluoride, cyano ethylated polyol, polyvinyl phosphor benzene, polyvinyl quinoline, polyvinyl pyridazine, polyvinyl pyrimidine, polymethylpyridine, polydimethylpyridine, etc. They may be used alone, or as a blend, as well as they may be used in combination with other resin such as polyacrylic acid ester, acrylic styrene resin, methacrylstyrene resin, vinyl chloride/vinyl acetate copolymer, silicon resin, alkyd resin, epoxy resin or like other resin as required. It is preferred that the thickness of the highly dielectric film is as thin as possible, with a view point of maintaining a large electrostatic capacity thereof, within such a range as not reducing the mechanical strength or the frictional resistance of the film or not causing insulation destruction, and a film of a thickness from 1 μm to 50 μm, preferably, from 5 μm to 30 μm is suitable to the purpose of the present invention.

The composite sheet according to the present invention can be obtained by laminating the above-mentioned semiconductor film on the highly dielectric film. For the lamination, there can be used a method of laminating them with a tack agent, a method of coating a paint containing a fibrous electroconductive filler on a highly dielectric film and laminating it simultaneously with the formation of a semiconductor film without using a tack agent, or a method of press-bonding under heating a semiconductor film and a highly dielectric film. A method of using the tack agent is preferred in view of a mechanical strength and the easy laminating fabrication of the composite sheet. As the tack agent, those not deteriorating the property of the highly dielectric film are used such as polyacrylic acid ester, polyacrylic styrene, polymethacrylic styrene, alkyd resin, epoxy resin, vinyl chloride/vinyl acetate copolymer, styrene butadiene rubber, etc. These resins may be used alone, or as a blend and these resins may be used together with other resin if required. It is necessary that the tack agent has a thickness of from 1 to 30 μm, preferably, from 3 to 10 μm. If the thickness is too large, the property of the highly dielectric film is deteriorated to reduce the performance of possessing electrostatic charges and no clear image can be obtained. On the other hand, if the thickness is insufficient, bubbles are liable to intrude upon lamination thereby deteriorating appearance and causing unevenness in the image, as well as the mechanical strength of the composite sheet is reduced.

The composite sheet according to the present invention is excellent in durability and moisture proofness, excellent in stability of the electroconductivity, and excellent in frictional resistance, and shows less change of the resistance even if mechanical tension is applied and a stable non-mobile image or still image forming performance in a circumstance at low to high humidity conditions, as well as it can provide a sheet of large area with an industrial advantage, and accordingly, it is suitable to electrostatic recording use such as in large sized display, large sized facsimile machine or large sized copying machine.

Furthermore, since the composite sheet according to the present invention can provide reproducible display and easily give a sheet of large area as apparent from the constitution, it enables to provide apparatus for displaying, transmitted and recording large image information such as large-sized copying machine, large-sized display or large-sized facsimile machine based on the direct charging system at an extremely reduced cost.

The present invention will be more precisely explained while referring to examples as follows.

However, the present invention is not restricted to examples under mentioned. From the foregoing description, one skilled in the art can easily ascertain the essential characteristics of this invention, and without departing from the spirit and scope thereof, can make various changes and modifications of the invention to adapt to it various usages and conditions.

EXAMPLE 1

67 parts of polyurethane having 30% by weight of solid content (Pendex T-5265L, manufactured by DIC Co.), 10 parts of electroconductive potassium titanate fibers (Dentol WK-100, manufactured by Otsuka Kagaku Co., aspect ratio: 20–100, major axis: 10–20 μm) and 20 parts of titanium dioxide were kneaded together with 30 parts of DMF to prepare an electroconductive paint. A semiconductor film having a dry film thickness of 50 μm and a surface resistivity of $2\times10^7$ Ω/□ was prepared by using the obtained paint. The obtained semiconductor film was laminated together with a polyvinylidene fluoride film of 25 μm in thickness (KF film P-20, manufactured by Kureha Kagaku Kogyo Co., specific dielectric constant: 10) by using a polyacrylic acid ester (Saibinolu X381-163S, manufactured by Saiden Kagaku Co.) as a tack agent (coating thickness of tack agent: 10 μm) and, further, a reinforcing PET (Diapet, manufactured by Mitsubishi Kasei Corp., film thickness: 100 μm) was laminated with the semiconductor film by using an adhesive [a mixture of Seikabondo E-263 and Seikabondo C-26 (100/20 (wt/wt)), both manufactured by Dainichiseika Co.], thereby obtaining a composite sheet A of a constitution shown in FIG. 1 (in the figure, are shown 1: KF film P-20, 2: tack agent layer of polyacrylic ester, 3: semiconductor film, 4: adhesive and 5: PET film).

EXAMPLE 2

67 parts of polyurethane having 30% by weight of solid content (Pendex T-5265L, manufactured by DIC Co.), 10 parts of stainless steel fibers (Bekkishield, manufactured by Nissan Kagaku Kogyo Co., aspect ratio: 500, major axis: 1 mm) and 30 parts of titanium dioxide were kneaded together with 30 parts of DMF to prepare an electroconductive paint. A semiconductor film having a dry film thickness of 50 μm and a surface resistivity of $3\times10^5$ Ω/□ was prepared by using the obtained paint. The obtained semiconductor film was laminated together with a blend polymer film comprising a polyvinylidene fluoride and PET (KF-B-40, manufactured by Kureha Kagaku Kogyo Co., film thickness: 25 μm, specific dielectric constant: 8) by using a polyacrylic styrene (Konisi CZ 120L, manufactured by Konisi Co.) as a tack agent (coating thickness of tack agent: 15 μm) and, further, a reinforcing PET (Diapet manufactured by Mitsubishi Kasei Corp., film thickness: 100 μm) was laminated on the semiconductor film by using an adhesive (the same as Example 1) to obtain a composite sheet B of a constitution shown in FIG. 2 (in the figure, are shown 6: KF-B-40, 2: tack agent layer of polyacrylic ethylene, 3: semiconductor film, 4: adhesive and 5: PET film).

EXAMPLE 3

Figure 3:
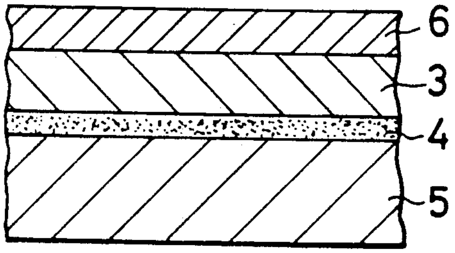
FIGS. 3, 4 and 7 show, respectively, composite sheets in which a semiconductor film and highly dielectric film are laminated without using a tack agent.

67 parts of polyurethane having 30% by weight of solid content (NH-1002, manufactured by Sumitomo Bayer Urethane Co.), 15 parts of electroconductive titanium dioxide fibers (Ft-1000, manufactured by Ishihara Sangyo Co., aspect ratio: 30–100, major axis: 3–6 μm) and 20 parts of titanium dioxide were kneaded together with 30 parts of toluene to prepare an electroconductive paint. The obtained paint was coated on a blend polymer film comprising a polyvinylidene fluoride and PET (KF-B-40, manufactured by Kureha Kagaku Kogyo Co., film thickness: 25 μm, specific dielectric constant: 8) to prepare a composite sheet comprising a semiconductor film having 40 μm dry thickness and surface resistivity of $2\times10^5$ Ω/□, and a highly dielectric film. Further, the film was laminated with PET by using an epoxy resin as an adhesive (tacking agent), thereby obtaining a composite sheet C of a constitution shown in FIG. 3 (in the figure, are shown 6: KF-B-40, 3: semiconductor film, 4: adhesive and 5: PET film).

EXAMPLE 4

Figure 4:
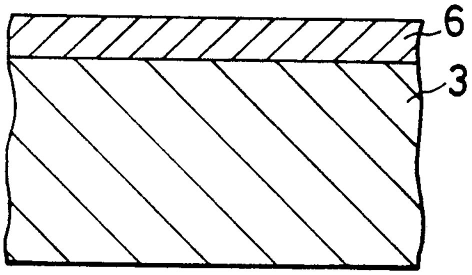

50 parts of a polyethylene resin (ACE Polyethy HD, manufactured by ACE polymer Co.) and 70 parts of electroconductive titanium dioxide fiber (FT-1000, manufactured by Ishihara Sangyo Co., aspect ratio: 30–100, major axis: 3–6 μm) were kneaded at 150° C. and heat-pressed to obtain a semiconductor film having 0.2 mm in thickness and a surface resistivity of $2\times10^8$ Ω/□. The resultant film and a blend polymer film of polyvinylidene fluoride and PET (KF-B-40, manufactured by Kureha Kagaku Kogyo Co., film thickness: 25 μm, specific dielectric constant: 8) were heat-pressed to obtain a composite sheet D of a constitution shown in FIG. 4 (in the figure, are shown 6: KF-B-40 and 3: semiconductor film).

COMPARATIVE EXAMPLE 1

Figure 5:
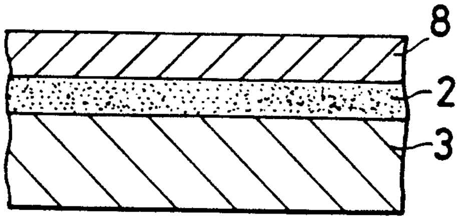

67 parts of polyurethane having 30% by weight of solid content (Pendex T-5265L, manufactured by DIC Co.) and 30 parts of electroconductive zinc oxide (manufactured by Hakusui Co., aspect ratio: 1–2, particle size: 0.1–0.25 μm) were kneaded together with 30 parts of DMF to prepare an electroconductive paint. By using the obtained paint, a semiconductor surface resistivity $2\times10^7$ Ω/□ was prepared. The resultant film was laminated together with a polyvinylidene fluoride film of 25 μm in thickness (KF film, manufactured by Kureha Kagaku Kogyo Co., specific dielectric constant: 10) by using a polyacrylic acid ester (Saibinolu X381-163S, manufactured by Saiden Kagaku Co.) as a tack agent (coating thickness of tack agent: 25 μm) to obtain a comparative composite sheet E of a constitution shown in FIG. 5 (in the figure, are shown 8: KF film, 2: tack agent layer of polyacrylic acid ester, 3: semiconductor film).

COMPARATIVE EXAMPLE 2

Figure 6:
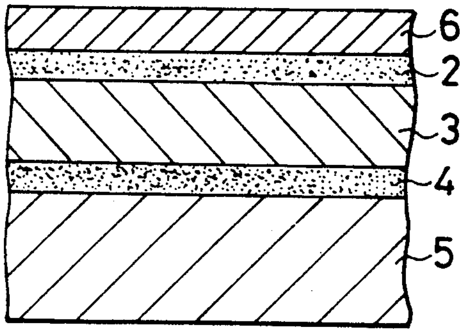

67 parts of polyurethane having 30% by weight of solid content (Pendex T-5265L, manufactured by DIC Co.) was kneaded with 30 parts of electroconductive titanium dioxide (ET-500, manufactured by Ishihara Sangyo Co., aspect ratio: 1–2, particle size: 0.5–1.0 μm) to prepare an electroconductive paint. Using the obtained paint, a semiconductor film having a surface resistivity of $5\times10^8$ Ω/□ and dry film thickness of 50 μm was prepared. The resultant film was laminated together with a blend polymer film comprising polyvinylidene chloride and PET (KF-B-40, manufactured by Kureha Kagaku Kogyo Co., film thickness: 20 μm, specific dielectric constant: 8) by using a polyacrylic acid ester (Saibinolu X 381-163S, manufactured by Saiden Kagaku Co.) as a tack agent (coating thickness of tack agent: 7 μm) and, further, a reinforcing PET (Diapet, manufactured by Mitsubishi Kasei Corp., 100 μm in thickness) was laminated with the semiconductor film by using an adhesive to obtain a comparative composite sheet F of a constitution shown in FIG. 6 (in the figure, are shown 6: KF-B-40, 2: tack agent layer of polyacrylic acid ester, 3: semiconductor film, 4: adhesive and 5: PET film.)

COMPARATIVE EXAMPLE 3

Figure 7:
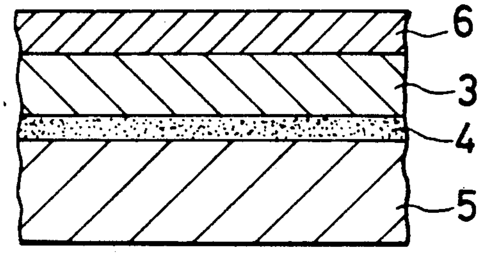

67 parts of polyurethane having 30% by weight of solid content (NH-8002, manufactured by Sumitomo Bayer Urethane Co.) and 30 parts of electroconductive zinc oxide (manufactured by Honjo Kagaku Co., aspect ratio: 1–2, particle size: 0.1–0.25 μm) were kneaded together with 30 parts of DMF to prepare an electroconductive paint. The obtained paint was coated on a blend polymer film comprising polyvinylidene fluoride and PET (KF-B-40, manufactured by Kureha Kagaku Kogyo Co., film thickness: 20 μm, specific dielectric constant: 8), thereby obtaining a composite sheet comprising a semiconductor film having a dry film thickness of 40 μm and a surface resistivity of $3\times10^7$ Ω/□, and a highly dielectric film. Further, the resultant film was laminated with a reinforcing PET (Diapet, manufactured by Mitsubishi Kasei Corp., 100 μm in thickness) by using an epoxy resin as an adhesive (tacking agent) to obtain a comparative composite sheet G of a constitution shown in FIG. 7 (in the figure, are shown 6: KF-B-40, 3: semiconductor film, 4: adhesive and 5: PET film).

COMPARATIVE EXAMPLE 4

Figure 8:
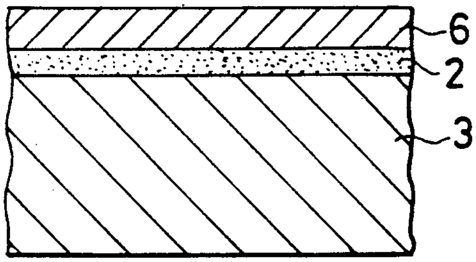

50 parts of a polyethylene resin (ACE Polyethy HD, manufactured by ACE Polymer Co.) and 70 parts of electroconductive titanium dioxide (ET 500W, manufactured by Ishihara Sangyo Co., aspect ratio: 1–2, particle size: 0.5–1.0 μm) were kneaded at 150° C. and heat-pressed to obtain a semiconductor film having a thickness of 0.2 mm and a surface resistivity of $5\times10^8$ Ω/□. The resultant film and a blend polymer film comprising polyvinylidene chloride and PET (KF-B-40, manufactured by Kureha Kagaku Kogyo Co., film thickness: 20 μm, specific dielectric constant: 8) were laminated by using an epoxy resin as a tack agent (coating thickness: 7 μm), thereby obtaining a comparative composite sheet H of a constitution shown in FIG. 8 (in the figure, are shown 6: KF-B-40, 2: tack agent layer of epoxy resin and 3: semiconductor film).

COMPARATIVE EXAMPLE 5

Figure 9:
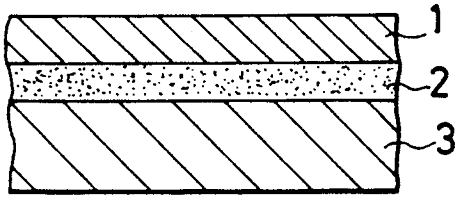

67 parts of polyurethane having 30% by weight of solid content (Pendex T-5265L, manufactured by DIC Co.) and 30 parts of electroconductive potassium titanate fibers (FT-1000, manufactured by Ishihara Sangyo Co., aspect ratio: 30–100, major axis: 3–6 μm) were kneaded together with 30 parts of DMF to prepare an electroconductive paint. By using the obtained paint, a semiconductor film having a dry film thickness of 50 μm and a surface resistivity of $8\times10^2$ Ω/□ was prepared. The resultant film was laminated together with a polyvinylidene fluoride film of 25 μm thickness (KF film P-20, manufactured by Kureha Kagaku Kogyo Co., specific dielectric constant: 10) by using a polyacrylic acid ester (Saibinolu X381-163S, manufactured by Saiden Kagaku Co.) as a tack agent (coating thickness: 10 μm), to obtain a comparative composite sheet I of a constitution shown in FIG. 9 (in the figure, are shown 1: KF film P-20, 2: tack agent layer of polyacrylic acid ester and 3: semiconductor film).

COMPARATIVE EXAMPLE 6

Figure 10:
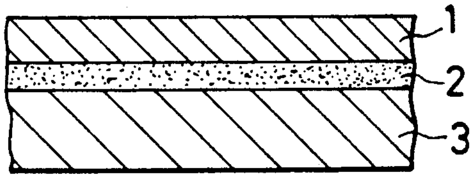

67 parts of polyurethane having 30% by weight of solid content (Pendex T-5265L, manufactured by DIC Co.) and 5 parts of electroconductive potassium titanate fibers (FT-1000, manufactured by Ishihara Sangyo Co., aspect ratio: 30–100, major axis: 3–6 μm) and 20 parts of titanium dioxide were kneaded together with 30 parts of DMF to prepare an electroconductive paint. By using the obtained paint, a semiconductor film having a dry film thickness of 50 μm and a surface resistivity of $2\times10^{10}$ Ω/□ was prepared. The resultant film was laminated together with a polyvinylidene fluoride film of 25 μm in thickness (KF film P-20, manufactured by Kureha Kagaku Kogyo Co., specific dielectric constant: 10) by using a polyacrylic acid ester (Saibinolu X381-163S, manufactured by Saiden Kagaku Co.) as a tack agent (coating thickness: 10 μm), to obtain a comparative composite sheet J of a constitution shown in FIG. 10 (in the figure, are shown 1: KF film P-20, 2: tack agent layer of polyacrylic acid ester and 3: semiconductor film).

EXAMPLE 5

80 parts of polyurethane having 30% by weight of solid content (Pendex T-5265L, manufactured by DIC Co.) and 10 parts of nickel-coated mica (EC-150, manufactured by Kuraray Co., flake diameter: 210 μm, thickness: 4.2 μm, aspect ratio: 50–100) and 20 parts of titanium dioxide were kneaded together with 30 parts of DMF to prepare an electroconductive paint. Using the obtained paint, a semiconductor film having a dry film thickness of 50 μm and a surface resistivity of $2\times10^{4}$ Ω/□ was prepared. The resultant film was laminated together with a polyvinylidene fluoride film of 25 μm in thickness (KE P-20, manufactured by Kureha Kagaku Kogyo Co., specific dielectric constant: 10) by using a polyacrylic acid ester [a mixture of Seikabondo T-916 and Seikabondo C-26(15/0.225 (wt/wt)), both manufactured by Dainichiseika Co.] as a tack agent (coating thickness: 10 μm) and, further, a reinforcing PET (Diapet, manufactured by Mitsubishi Kasei Corp., film thickness: 100 μm) was laminated with the semiconductor film by using an adhesive (the same as Example 1), to obtain a composite sheet A' of a constitution as shown in FIG. 1.

EXAMPLE 6

Figure 2:
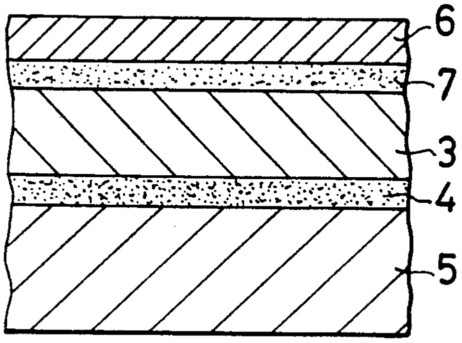

75 parts of polyurethane having 30% by weight of solid content (Pendex T-5265L, manufactured by DIC Co.) and 10 parts of nickel-coated mica (Nichimalka 340, manufactured by Mitsubishi Kinzoku Kogyo Co., flake diameter: 30–40 μm, thickness: 0.1–0.3 μm, aspect ratio: 100–300) and 30 parts of titanium dioxide were kneaded together with 30 parts of DMF to prepare an electroconductive paint. Using the obtained paint, a semiconductor film having a dry film thickness of 50 μm and a surface resistivity of $1.5\times10^{5}$ Ω/□ was prepared. The resultant film was laminated together with a blend polymer film comprising polyvinylidene fluoride and PET (KF-B-40, manufactured by Kureha Kagaku Kogyo Co., film thickness: 25 μm, specific dielectric constant: 8) by using a polyacrylic acid ester (Saibinolu X381-163S, manufactured by Saiden Kagaku Co.) as a tack agent (coating thickness: 15 μm) and, further, a reinforcing PET (Diapet, manufactured by Mitsubishi Kasei Corp., film thickness: 100 μm) was laminated with the semiconductor film by using an adhesive (the same as Example 1), to obtain a composite sheet B' of a constitution as shown in FIG. 2.

EXAMPLE 7

80 parts of polyurethane having 30% by weight of solid content (NH-8002, manufactured by Sumitomo Bayer Urethane Co.), 10 parts of aluminum flake (K-102HE, manufactured by Transmet Co., 1 mm×1.4 mm×0.025 mm) and 20 parts of electroconductive zinc oxide (manufactured by Hakusui Co., aspect ratio: 1–2, particle size 0.1–0.25 μm) were kneaded together with 30 parts of DMF to prepare an electroconductive paint. The obtained paint was coated to a blend polymer film comprising polyvinylidene fluoride and PET (KF-B-40, manufactured by Kureha Kagaku Kogyo Co., film thickness: 25 μm, specific dielectric constant: 8) to prepare a composite sheet comprising a semiconductor film having a dry film thickness of 40 μm and a surface resistivity of $2\times10^{4}$ Ω/□, and a highly dielectric film. Further, the resultant film was laminated together with PET by using an epoxy resin as an adhesive (tacking agent), thereby obtaining a composite sheet C' of a constitution shown in FIG. 3.

EXAMPLE 8

50 parts of a polyethylene resin (ACE polyethy HD, manufactured by ACE Polymer Co.), 40 parts of electroconductive titanium dioxide fibers (FT-1000, manufactured by Ishihara Sangyo Co., aspect ratio: 30–100, major axis: 3–6 μm) and 25 parts of nickel-coated mica (Nichimalka 340, manufactured by Mitsubishi Kinzoku Kogyo Co., flake diameter: 30–40 μm, thickness: 0.1–0.3 μm, aspect ratio: 100–300) were kneaded at 150° C. and heat pressed to obtain a semiconductor film having a thickness of 0.2 mm and a surface resistivity of $8\times10^{8}$ Ω/□. The resultant film and a blend polymer film comprising polyvinylidene fluoride and PET (KF-B-40, manufactured by Kureha Kagaku Kogyo Co., film thickness: 45 μm, specific dielectric constant: 8) were heat-pressed, thereby obtaining a composite sheet D' of a composition shown in FIG. 4.

EXAMPLE 9

133 parts of polyurethane having 30% by weight of solid content (Pendix K-5265L, manufactured by DIC Co.), 4 parts of fibrous titanium dioxide coated with composite oxide comprising 86.8% by weight of tin oxide (calculated as Sn), 12.9% of antimony oxide (calculated as Sb) and 0.3% by weight of cobalt oxide (calculated as Co), which was endowed with electroconductivity (manufactured by Otsuka Kagaku Co., aspect ratio: 30–100, major axis: 3–6 μm) and 45 parts of titanium dioxide (R-5N, manufactured by Sakai Kagaku Co.) were kneaded together with 60 parts of DMF to prepare an electroconductive paint. The obtained paint was coated on a release paper to prepare a semiconductor film having a dry film thickness of 50 μm and a surface resistivity of $5\times10^{5}$ Ω/□. A reinforcing PET (Diapet manufactured by Mitsubishi Kasei Corp., film thickness: 100 μm) was laminated with the resultant film by using an adhesive (the same as Example 1), thereby obtaining a three layered composite sheet. Further, a polyacrylic acid ester (Saibinolu X381-163S, manufactured by Saiden Kagaku Co.) as a tack agent (coating thickness: 8 μm) was coated on the semiconductor film and a polyvinylidene fluoride film of 25 μm thickness (KF film P-20, manufactured by Kureha Kagaku Kogyo Co., specific dielectric constant: 10) was laminated thereon to obtain a five-layered composite sheet.

EXAMPLE 10

133 parts of polyurethane having 30% by weight of solid content (Pendex K-5265L, manufactured by DIC Co.), 18 parts of fibrous potassium titanate coated with a composite oxide comprising 89.5% by weight of tin oxide (calculated as Sn), 10.3% by weight of antimony oxide (calculated as Sb) and 0.2% by weight of cobalt oxide (calculated as Co), which was endowed with electroconductivity (manufactured by Otsuka Kagaku Co., aspect ratio: 30–100, major axis: 10–20 μm), 2 parts of electroconductive granular titanium dioxide (W1, manufactured by Mitsubishi Kinzoku Kogyo Co.) and 40 parts of titanium dioxide (R-5N, manufactured by Sakai Kagaku Co.) were kneaded together with 60 parts of DMF to prepare an electroconductive paint. The obtained paint was coated on a release paper, thereby obtaining a semiconductor film having a dry film thickness of 50 μm and a surface resistivity of $5\times10^6$ Ω/□. The resultant film was laminated with a reinforcing PET in the same manner as in Example 9 to obtain a three-layered composite sheet. Further, a polyacrylic acid ester [a mixture of Seikabondo T-916 and Seikabondo C-26 (15/0.225 (wt/wt)), both manufactured by Dainichiseika Co.] as a tack agent (coating thickness: 8 μm) was coated on the semiconductor film and a polyvinylidene fluoride film of 25 μm thickness (KF film P-20, manufactured by Kureha Kagaku Kogyo Co., specific dielectric constant: 10) was laminated thereon to obtain a five-layered composite sheet.

EXAMPLE 11

100 parts of polyurethane having 30% by weight of solid content (PC-14CL, manufactured by Hitachi Kasei Co.), 25 parts of muscovite coated with a composite oxide comprising 87.8% by weight of tin oxide (calculated as Sn), 11.8% by weight of antimony oxide (calculated as Sb) and 0.4% by weight of cobalt oxide (calculated as Co), which was endowed with electroconductivity (manufactured by Otsuka Kagaku Co., flake diameter: 40 μm, thickness: 3 μm, aspect ratio: 10–20) and 45 parts of titanium dioxide (R-5N, manufactured by Sakai Kagaku Co.) were kneaded together with 40 parts of DMF, thereby obtaining an electroconductive paint. The obtained paint was coated on a blend polymer film comprising polyvinylidene fluoride and PET (KF-B-40, manufactured by Kureha Kagaku Kogyo Co., film thickness: 25 μm, specific dielectric constant: 8) to obtain a composite sheet comprising a semiconductor film having dry film thickness of 40 μm and surface resistivity of $7\times10^6$ Ω/□ and a dielectric film. Further, an adhesive (the same as Example 1)-coated reinforcing PET (Diapet, manufactured by Mitsubishi Kasei Corp., film thickness: 100 μm) was laminated thereon to form a four-layered composite sheet.

EXAMPLE 12

40 parts of a polyethylene resin (Sumikasen G701, manufactured by Sumitomo Kagaku Kogyo Co.), 40 parts of fibrous potassium titanate coated with a composite oxide comprising 89.5% by weight of tin oxide (calculated as Sn), 10.3% by weight of antimony oxide (calculated as Sb) and 0.2% by weight of cobalt oxide (calculated as Co), which was endowed with electroconductivity (manufactured by Otsuka Kagaku Co., aspect ratio: 30–100, major axis 10–20 μm) and 20 parts of titanium dioxide (CR-80, manufactured by Ishihara Sangyo Co.) were kneaded at 120° C. and heat-pressed to obtain a semiconductor film of a thickness of 0.2 μm and a surface resistivity of $8\times10^8$ Ω/□. A polyvinylidene fluoride film of 25 μm in thickness (KF film P-20, Kureha Kagaku Kogyo Co., specific dielectric constant: 10) was laminated to the semiconductor film by heat pressing, thereby obtaining a two-layered composite sheet.

EXAMPLE 13

130 parts of polyurethane having 30% by weight of solid content (Pendex T-5265L, manufactured by DIC Co.), 15 parts of electroconductive potassium titanium fibers (Dentol WT-200, manufactured by Otsuka Kagaku Co., aspect ratio: 30–100, major axis: 10–20 μm) and 45 parts of titanium dioxide (R-5N, manufactured by Sakai Kagaku Co.) were kneaded together with 60 parts of DMF to prepare an electroconductive paint. The obtained paint was coated on release paper to prepare a semiconductor film having a dry film thickness of 50 μm and a surface resistivity of $7\times10^5$ Ω/□. A reinforcing PET (Diapet, manufactured by Mitsubishi Kasei Corp., film thickness: 100 μm) was laminated with the resultant film by using an adhesive (the same as Example 1) and, further, a polyacrylic acid ester [a mixture of Seikabondo T-916 and Seikabondo C-26 (15/0.225 (wt/wt)), both manufactured by Dainichiseika Co.] as a tack agent (coating thickness: 8 μm) was coated on the semiconductor film and a polyvinylidene fluoride film of 25 μm thickness (KFT-20, manufactured by Kureha Kagaku Kogyo Co., specific dielectric constant: 10) was laminated thereon, to obtain a composite sheet A″.

125 parts of polyurethane having 30% by weight of solid content (Pendex T-5265L, manufactured by DIC Co.), 17 parts of electroconductive potassium titanium fiber (Dentol WT-300, manufactured by Otsuka Kagaku Co., aspect ratio: 30–100, major axis: 10–20 μm), 3 parts of electroconductive zinc oxide (electroconductive zinc oxide 23-K, manufactured by Hakusui Co.) and 40 parts of titanium dioxide (R-5N, manufactured by Sakai Kagaku Co.) were kneaded together with 60 parts of DMF to prepare an electroconductive paint. The obtained paint was coated on release paper to prepare a semiconductor film having a dry film thickness of 50 μm and a surface resistivity of $2\times10^6$ Ω□. A reinforcing PET film was laminated in the same manner as in Example 13 and, further, a polyacrylic acid ester (Saibinolu 65B, manufactured by Saiden Kagaku Co.,) as a tack agent (coating thickness: 9 μm) was coated on the semiconductor film and a polyvinylidene fluoride film of 25 μm thickness (KFT-20, manufactured by Kureha Kagaku Kogyo Co., specific dielectric constant: 10) was laminated thereon, to obtain a composite sheet B″.

EXAMPLE 15

130 parts of polyurethane having 30% by weight of solid content (PC-14C, manufactured by Hitachi Kasei Co.), 13 parts of electroconductive titanium oxide fibers (FT-1000, manufactured by Ishihara Sangyo Co., aspect ratio: 30–100, major axis: 3–6 μm), 2 parts of electroconductive mica (EC-150, manufactured by Kuraray Co., flake diameter: 210 μm, aspect ratio: 50–100, thickness: 4.2 μm) and 45 parts of titanium dioxide (R-5N, manufactured by Sakai Kagaku Co.) were kneaded together with 40 parts of DMF to prepare an electroconductive paint. The obtained paint was coated on a blend polymer film comprising polyvinylidene fluoride and PET (KF-B-40, manufactured by Kureha Kagaku Kogyo Co., film thickness: 25 μm, specific dielectric constant: 8) to prepare a composite film comprising a semiconductor film having a dry film thickness of 40 μm and a surface resistivity of $7\times10^6$ Ω/□ on the dielectric film. Further, an adhesive (the same as Example 1)-coated reinforcing PET film (Diapet, manufactured by Mitsubishi Kasei Corp., film thickness: 100 μm) was laminated with the semiconductor film to obtain a composite sheet C".

EXAMPLE 16

133 parts of polyurethane having 30% by weight of solid content (Pendix K-5265L, manufactured by DIC Co.), 20 parts of fibrous titanium dioxide coated with composite oxide comprising 89.7% by weight of tin oxide (calculated as Sn), 10.3% of antimony oxide (calculated as Sb), which was endowed with electroconductivity (manufactured by Otsuka Kagaku Co., aspect ratio: 30–100, major axis: 3–6 μm) and 45 parts of titanium dioxide (R-5N, manufactured by Sakai Kagaku Co.) were kneaded together with 60 parts of DMF to prepare an electroconductive paint. The obtained paint was coated on a release paper to prepare a semiconductor film having a dry film thickness of 50 μm and a surface resistivity of $2\times10^7$ Ω/□. A reinforcing PET (Diapet manufactured by Mitsubishi Kasei Corp., film thickness: 100 μm) was laminated with the resultant film by using an adhesive (the same as Example 1), thereby obtaining a three layered composite sheet. Further, a polyacrylic acid ester (Saibinolu 65B, manufactured by Saiden Kagaku Co.) as a tack agent (coating thickness: 8 μm) was coated on the semiconductor film and a polyvinylidene fluoride film of 25 μm thickness (KF film P-20, manufactured by Kureha Kagaku Kogyo Co., specific dielectric constant: 10) was laminated thereon to obtain a five-layered composite sheet.

EXAMPLE 17

133 parts of polyurethane having 30% by weight of solid content (Pendex K-5265L, manufactured by DIC Co.), 18 parts of fibrous potassium titanate coated with a composite oxide comprising 87.5% by weight of tin oxide (calculated as Sn), 12.5% by weight of antimony oxide (calculated as Sb), which was endowed with electroconductivity (manufactured by Otsuka Kagaku Co., aspect ratio: 30–100, major axis: 10–20 μm), 2 parts of electroconductive granular titanium dioxide (W1, manufactured by Mitsubishi Kinzoku Kogyo Co.) and 40 parts of titanium dioxide (R-5N, manufactured by Sakai Kagaku Co.) were kneaded together with 60 parts of DMF to prepare an electroconductive paint. The obtained paint was coated on a release paper, thereby obtaining a semiconductor film having a dry film thickness of 50 μm and a surface resistivity of $8\times10^5$ Ω/□. The resultant film was laminated with a reinforcing PET in the same manner as in Example 9 to obtain a three-layered composite sheet. Further, a polyacrylic acid ester (Saibinolu 65B, manufactured by Saiden Kagaku Co.) as a tack agent (coating thickness: 8 μm) was coated on the semiconductor film and a polyvinylidene fluoride film of 25 μm thickness (KF film P-20, manufactured by Kureha Kagaku Kogyo Co., specific dielectric constant: 10) was laminated thereon to obtain a five-layered composite sheet.

EXAMPLE 18

100 parts of polyurethane having 30% by weight of solid content (PC-14CL, manufactured by Hitachi Kasei Co.), 25 parts of muscovite coated with a composite oxide comprising 86.5% by weight of tin oxide (calculated as Sn), 13.5% by weight of antimony oxide (calculated as Sb), which was endowed with electroconductivity (manufactured by Otsuka Kagaku Co., flake diameter: 40 μm, thickness: 3 μm, aspect ratio: 10–20) and 45 parts of titanium dioxide (R-5N, manufactured by Sakai Kagaku Co.) were kneaded together with 40 parts of DMF, thereby obtaining an electroconductive paint. The obtained paint was coated on a blend polymer film comprising polyvinylidene fluoride and PET (KF-B-40, manufactured by Kureha Kagaku Kogyo Co., film thickness: 25 μm, specific dielectric constant: 8) to obtain a composite sheet comprising a semiconductor film having dry film thickness of 40 μm and surface resistivity of $9\times10^4$ Ω/□ and a dielectric film. Further, an adhesive (the same as Example 1)-coated reinforcing PET (Diapet, manufactured by Mitsubishi Kasei Corp., film thickness: 100 μm) was laminated thereon to form a four-layered composite sheet.

EXAMPLE 19

40 parts of a polyethylene resin (Sumikasen G701, manufactured by Sumitomo Kagaku Kogyo Co.), 40 parts of fibrous potassium titanate coated with a composite oxide comprising 89.7% by weight of tin oxide (calculated as Sn), 10.3% by weight of antimony oxide (calculated as Sb), which was endowed with electroconductivity (manufactured by Otsuka Kagaku Co., aspect ratio: 30–100, major axis 10–20 μm) and 20 parts of titanium dioxide (CR-80, manufactured by Ishihara Sangyo Co.) were kneaded at 120° C. and heat-pressed to obtain a semiconductor film of a thickness of 0.2 μm and a surface resistivity of $6\times10^7$ Ω/□. A polyvinylidene fluoride film of 25 μm in thickness (KF film P-20, Kureha Kagaku Kogyo Co., specific dielectric constant: 10) was laminated to the semiconductor film by heat pressing, thereby obtaining a two-layered composite sheet.

EXAMPLE 20

Figure 11:
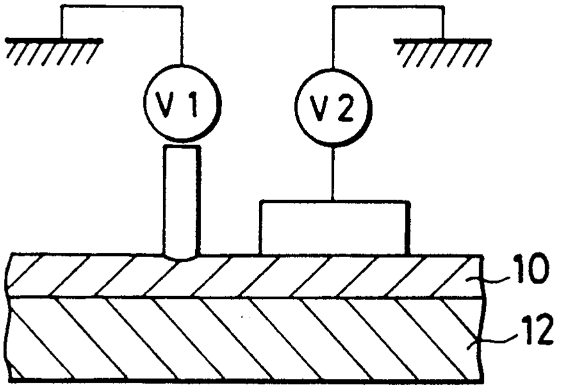
FIG. 11 is an apparatus for forming an electrostatic latent image on a composite sheet.

(1) Electrostatic latent images were formed on composite sheets obtained in Examples and Comparative Examples under the conditions at a temperature of 30° C. and at a humidity of 20% (RH) and 80% (RH) respectively by using an apparatus of a constitution shown in FIG. 11 which comprises writing electrode $V_1$ (+300 to +400) of stainless steel bar of 2 mm in diameter and control electrode $V_2$ (−300 to −400) of stainless steel plate of 20 mm×100 mm×2 mm, the writing electrode $V_1$ and control electrode $V_2$ were disposed on a composite sheet comprising highly dielectric film 10 and semiconductor film 11, at intervals of 10 mm. The writing electrode $V_1$ and control electrode $V_2$ were moved 10 mm at the rate of 50 mm/sec, while putting a load of 50 g and keeping the above-mentioned distance (10 mm). At this time, the voltage of +300 V to +400 V were applied to the writing electrode $V_1$ and the voltage of −300 V to −400 V were applied to the control electrode $V_2$, so as to apply the total voltage of 600 V or 800 V to the composite sheet. After writing, a toner (D232, manufactured by Fuji Xerox Co.) was immediately coated thereon, thereby visualizing the electrostatic latent image of the straight line of 100 mm, and the non-mobile image or still image forming performance for each of the composite sheet was evaluated as follows.

A: Electrostatic latent image of 100 mm was completely developed without breaking off, and having no light and shade (: Excellent).

B: Developed image of 100 mm has a light and shade rate of not more than 3% without breaking off.

C: Developed image of 100 mm has a light and shade rate of 3 to 5% without breaking off.

D: Developed image of 100 mm has a light and shade rate of more than 5% and is broken off.

(In order to accomplish the object of the present invention, it is necessary to have the evaluation "A".)

(2)By using an apparatus shown in FIGS. 12 (*a*)-(*d*), a test for 50,000 cycle pass of a composite sheet was conducted while applying 50 g/cm of line pressure from a metal head to each of the composite sheets fabricated into a loop-like shape, and the non-mobile image or still image forming performance before and after the test was compared to evaluate the durability as follows.

A: The non-mobile image or still image forming performance before the test is the same as that after the test (: Excellent).

B: The non-mobile image or still image forming performance after the test has a light and shade rate of not more than 3% as compared with that before the test.

C: The non-mobile image or still image forming performance after the test has a light and shade rate of 3 to 5% as compared with that before the test.

D: The non-mobile image or still image forming performance after the test has a light and shade rate of more than 5% as compared with that before the test and is broken off.

(In order to accomplish the object of the present invention, it is necessary to have the evaluation "A".)

Figure 12:
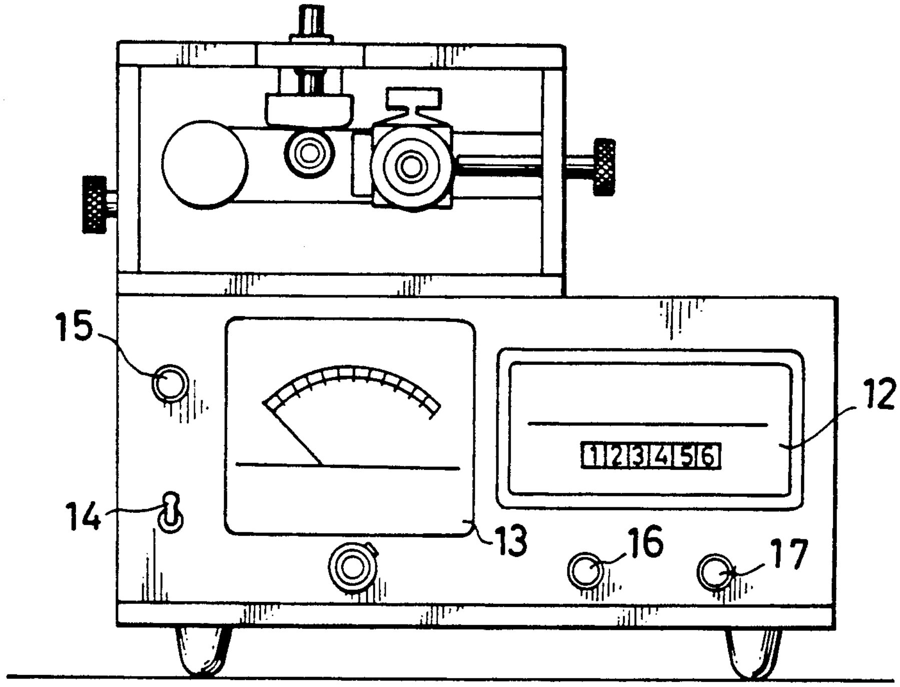
FIG. 12(*a*) is a front elevational view of an apparatus for measuring the durability of a composite sheet.
Figure 12:
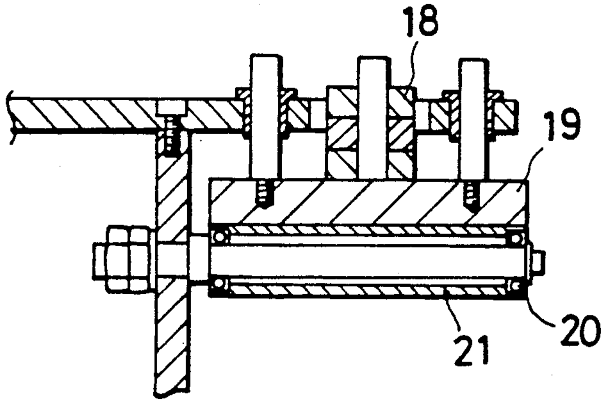
Figure 12:
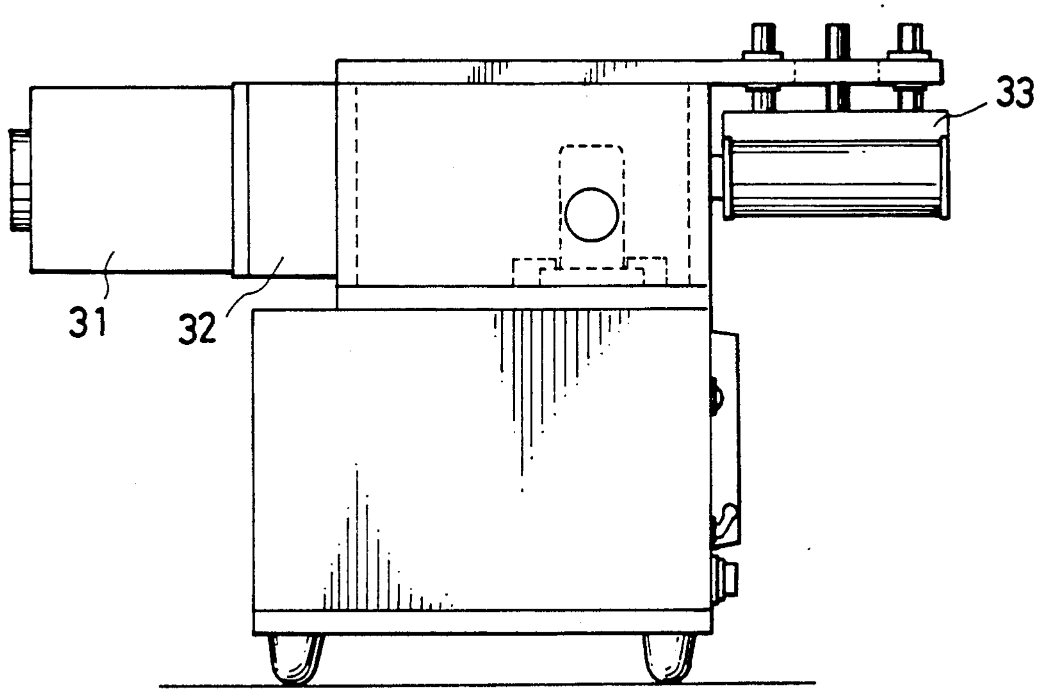
Figure 12D:
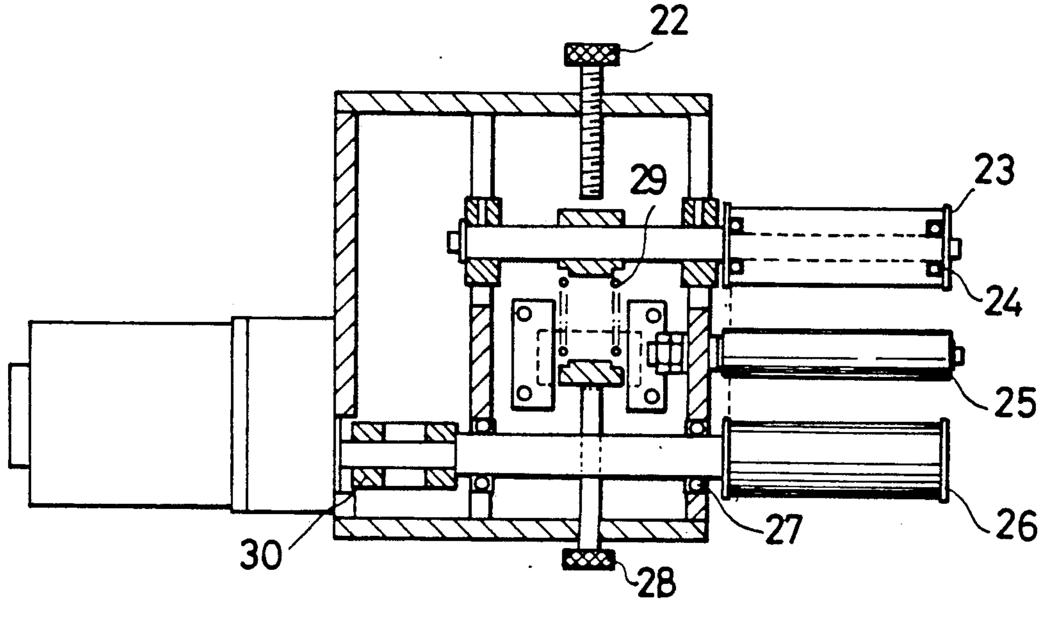

The apparatus for measuring the durability of the composite sheet is shown in FIGS. 12(*a*)-(*d*) in which respective components are depicted by reference numerals as below:

12: counter, 13: indicator for motor rpm, 14: power switch, 15: pilot lamp, 16: start switch, 17: stop switch, 18: weight, 19: head weight (SUS 410), 20: bearing (L1910ZZ), 21: receiving roller, 22: roller pushing knob, 23: tension roller, 24: bearing (#6000ZZ), 25: receiving roller, 26: drive roller, 27: bearing (#600ZZZNR), 28: spring compressing knob, 29: spring (ϕ25D, ϕ1.6d, effective number of turn: 5, free length: 52, spring constant: 88 g/mm), 30: Baumann Philipps coupling, 31: speed control motor (51K40RA-AZ), 32: gear head (5GK, 15K) and 33: head.

(3) By using the apparatus shown in FIGS. 12(*a*)-(*d*), a durability test for 50,000 cycle pass of the composite sheet was conducted, and the variation of the surface resistivity of the semiconductor film of the composite sheet before and after the test was obtained by using the following formula.

$$Z = \log(X) - \log(Y)$$

(wherein X represents a surface resistivity (Ω/□) of the semiconductor film before the test, Y represents a surface resistivity (Ω/□) of the semiconductor film after the test and Z represents a variation of surface resistivity)

A: Z is less than 0.5 (: Excellent).

B: Z is 0.5 to 1.0.

C: Z is 1.0 to 1.5.

D: Z is more than 1.5.

(In order to accomplish the objection of the present invention, it is necessary to have the evaluation "A".)

(4) Composite sheets were measured for the whiteness (L value), in which the surface of the dielectric film of these composite sheets was put on a glass surface of a digital hue color difference meter (UN-ICC-33H, manufactured by Toyo Seiki Seisakusho Co.).

(5) In a box of 45 cm×45 cm×20 cm, painted black at the inside in which a florescent lamp (Mellolook, 15W lamp, manufactured by Toshiba Corp.) was mounted as a light source, the composite sheet was attached at a distance of 3 cm from the light source and the tone after irradiation of light was measured to determine the color difference (ΔE) between the tone at the initial stage and the tone after irradiation of light, whereby light fastness was evaluated.

The results of these tests are shown in Tables 1 to 5.

TABLE 1

| Examples and Comparative Examples | Non-mobile image or still image forming performance 600V (30° C.) 20% | 600V (30° C.) 80% | 800V (30° C.) 20% | 800V (30° C.) 80% | Durability 50,000 cycle pass | Variation of surface resistivity 50,000 cycle pass |
|---|---|---|---|---|---|---|
| Example 1 | A | A | A | A | A | A |
| Example 2 | A | A | A | A | A | A |
| Example 3 | A | A | A | A | A | A |
| Example 4 | A | A | A | A | — | A |
| Comparative Example 1 | D | C | C | C | D | D |
| Comparative Example 2 | C | C | B | B | D | D |
| Comparative Example 3 | B | A | A | A | D | D |
| Comparative Example 4 | B | B | B | B | D | D |
| Comparative Example 5 | A | A | D | D | — | A |
| Comparative Example 6 | D | D | D | D | — | A |

TABLE 2

| Examples | Non-mobile image or still image forming performance 600V (30° C.) 20% | 600V (30° C.) 80% | 800V (30° C.) 20% | 800V (30° C.) 80% | Durability 50,000 cycle pass | Variation of surface resistivity 50,000 cycle pass |
|---|---|---|---|---|---|---|
| Example 5 | A | A | A | A | A | A |
| Example 6 | A | A | A | A | A | A |
| Example 7 | A | A | A | A | A | A |
| Example 8 | A | A | A | A | — | A |

TABLE 3

| Examples | Whiteness (L value) | Light fastness (ΔE) | Non-mobile image or still image forming performance 600V (30° C.) 20% | 600V (30° C.) 80% | 800V (30° C.) 20% | 800V (30° C.) 80% | Durability 50,000 cycle pass | Variation of surface resistivity 50,000 cycle pass |
|---|---|---|---|---|---|---|---|---|
| Example 9 | 88.4 | 1.3 | A | A | A | A | A | A |
| Example 10 | 90.2 | 0.8 | A | A | A | A | A | A |
| Example 11 | 89.3 | 1.0 | A | A | A | A | A | A |
| Example 12 | 87.6 | 1.4 | A | A | A | A | — | A |

TABLE 4

| Examples | Whiteness (L value) | Light fastness (ΔE) | Non-mobile image or still image forming performance 600V (30° C.) 20% | 600V (30° C.) 80% | 800V (30° C.) 20% | 800V (30° C.) 80% | Durability 50,000 cycle pass | Variation of surface resistivity 50,000 cycle pass |
|---|---|---|---|---|---|---|---|---|
| Example 13 | 86.3 | 2.1 | A | A | A | A | A | A |
| Example 14 | 88.9 | 2.0 | A | A | A | A | A | A |
| Example 15 | 86.6 | 1.3 | A | A | A | A | A | A |

TABLE 5

| Examples | Whiteness (L value) | Light fastness (ΔE) | Non-mobile image or still image forming performance 600V (30° C.) 20% | 600V (30° C.) 80% | 800V (30° C.) 20% | 800V (30° C.) 80% | Durability 50,000 cycle pass | Variation of surface resistivity 50,000 cycle pass |
|---|---|---|---|---|---|---|---|---|
| Example 16 | 87.0 | 2.5 | A | A | A | A | A | A |
| Example 17 | 86.9 | 3.1 | A | A | A | A | A | A |
| Example 18 | 86.2 | 3.3 | A | A | A | A | A | A |
| Example 19 | 85.5 | 3.8 | A | A | A | A | — | A |

As shown in Table 1, no satisfactory electrostatic image could be obtained if the resistance was higher or lower than a predetermined range. Further, if the granular electroconductive material was contained in the semiconductor film, although the non-mobile image or still image forming performance was satisfactory at the initial stage, the image quality was remarkably reduced after conducting the durability test. One the contrary, as shown in Tables 1 to 4, the composite sheet according to the present invention could maintain excellent non-mobile image or still image forming performance after conducting the durability test. Further, the composite sheet according to the present invention could maintain a stable non-mobile image or still image forming performance within a range from low to high temperature and electrostatic recording was possible substantially full range.

What is claimed is:

1. A composite sheet for reproducible electrostatic image display or record comprising, a semiconductor film containing a fibrous or flaky electroconductive filler and having a uniform surface resistivity of a range from $10^3$ to $10^{10}$ Ω/□ and a highly dielectric film having a specific dielectric constant of not less than 5, laminated with the semiconductor film.

2. A composite sheet according to claim 1, wherein the semiconductor film and the highly dielectric film are laminated through a tack agent layer of a thickness of 1 to 30 μm.

3. A composite sheet according to claim 1, wherein the electroconductive filler is a fibrous electroconductive filler having an aspect ratio of from 10 to 10,000 and a length of the major axis of from 0.1 μm to 5 mm.

4. A composite sheet according to claim 3, wherein the fibrous electroconductive filler is electroconductive carbon fiber, stainless steel fiber, aluminum fiber, metallized glass fiber, or a mixture thereof.

5. A composite sheet according to claim 1, wherein the electroconductive filler is a flaky electroconductive filler having a flake diameter of from 10 μm to 5 mm, and an aspect ratio (major axis/minor axis ratio) of from 10 to 1,000 and a thickness of from 0.05 to 10 μm.

6. A composite sheet according to claim 5, wherein the flaky electroconductive filler is aluminum flake, nickel flake, nickel-coated mica, or a mixture thereof.

7. A composite sheet according to claim 1, wherein the whiteness (L value) is not less than 85 and the color difference ($\Delta E$) is not greater than 4.

8. A composite sheet according to claim 7, wherein the electroconductive filler is coated with a composite oxide comprising from 80 to 90% by weight of tin oxide (calculated as Sn) and from 10 to 20% by weight of antimony oxide (calculated as Sb).

9. A composite sheet according to claim 7, wherein the electroconductive filler is coated with a composite oxide comprising from 85 to 90% by weight of tin oxide (calculated as Sn), from 10 to 15% by weight of antimony oxide (calculated as Sb) and from 0.05 to 1% by weight of cobalt oxide (calculated as Co).

10. A composite sheet according to claim 8, wherein the electroconductive filler is a fibrous electroconductive filler having an aspect ratio of from 10 to 10,000 and a length of major axis of from 0.1 μm to 5 mm, and a flaky electroconductive filler having a flake diameter of from 10 μm to 5 mm, an aspect ratio (major axis/minor axis ratio) of from 10 to 1,000 and a thickness of from 0.05 to 10 μm.

11. A composite sheet according to claim 9, wherein the electroconductive filler is a fibrous electroconductive filler having an aspect ratio of from 10 to 10,000 and a length of major axis of from 0.05 μm to 1 mm, and a flaky electroconductive filler having a flake diameter of from 10 μm to 5 mm, an aspect ratio (major axis/minor axis ratio) of from 10 to 1,000 and a thickness of from 0.05 to 10 μm.

12. A composite sheet according to claim 8 or 9, wherein the amount of the composite oxide coated on the electroconductive filler is from 10 to 30% by weight.

13. A composite sheet according to claim 8 or 9, wherein the core material of the electroconductive filler is mica as the flaky core material, and asbesto, wollastonite, potassium titanate fiber, plaster fiber, xolitlite, MOS fiber, PMF glass fiber, alumina fiber, ceramic fiber, rockwool fiber, titanium dioxide fiber or zinc oxide fiber as the fibrous core material.

14. A composite sheet according to claim 1, wherein the highly dielectric film is polyvinylidene fluoride, cyanoethylated polyol, polyvinyl phosphor benzene, polyvinyl quinoline, polyvinyl pyridazine, polyvinyl pyrimidine, polymethyl pyridine or polydimethyl pyridine, or a mixture thereof.

15. A composite sheet according to claim 1, wherein the semiconductor film is polyethylene, polypropylene, polystyrene, vinyl acetate, vinyl chloride, silicon resin, rubber, epoxy resin, polyurethane, acrylic resin, polycarbonate, a mixture thereof or a copolymer of monomers thereof.

16. A composite sheet according to claim 2, wherein the tack agent layer is polyacrylic acid ester, polyacrylic styrene, polymethacrylstyrene, alkyd resin, epoxy resin, vinyl chloride/vinyl acetate copolymer, styrene-butadiene rubber or a mixture thereof.

17. A composite sheet according to claim 1, wherein the semiconductor film contains a white pigment comprising titanium dioxide, zinc oxide, tin oxide and antimony oxide or a mixture thereof.

18. A composite sheet according to claim 4, wherein the thickness of the highly dielectric film is from 1 to 50 μm and the thickness of the semiconductor film is from 10 to 1000 μm.

19. A composite sheet according to claim 1, wherein the amount of the electroconductive filler to be added is from 50 to 200% by weight based on a base resin of the semiconductor film.

20. A composite sheet according to claim 17, wherein the amount of the white pigment to be added is from 50 to 200% by weight based on a base resin of the semiconductor film.

* * * * *